US008843171B2

(12) United States Patent
Nishikawa et al.

(10) Patent No.: US 8,843,171 B2
(45) Date of Patent: Sep. 23, 2014

(54) TRANSMISSION POWER CONTROL METHOD, BASE STATION APPARATUS AND MOBILE STATION APPARATUS

(75) Inventors: Daisuke Nishikawa, Kanagawa (JP); Yoshihisa Kishiyama, Kanagawa (JP); Mamoru Sawahashi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 784 days.

(21) Appl. No.: 13/121,095

(22) PCT Filed: Sep. 18, 2009

(86) PCT No.: PCT/JP2009/066342
§ 371 (c)(1),
(2), (4) Date: Jun. 20, 2011

(87) PCT Pub. No.: WO2010/035702
PCT Pub. Date: Apr. 1, 2010

(65) Prior Publication Data
US 2011/0237290 A1    Sep. 29, 2011

(30) Foreign Application Priority Data

Sep. 25, 2008 (JP) .................. 2008-246171
Apr. 24, 2009 (JP) .................. 2009-106649

(51) Int. Cl.
*H04W 52/42* (2009.01)
*H04W 52/58* (2009.01)
*H04W 88/02* (2009.01)
*H04W 52/54* (2009.01)
*H04W 52/14* (2009.01)

(52) U.S. Cl.
CPC .............. *H04W 52/42* (2013.01); *H04W 52/54* (2013.01); *H04W 88/02* (2013.01); *H04W 52/146* (2013.01)
USPC ........................................ 455/522

(58) Field of Classification Search
CPC ..... H04W 52/42; H04W 52/04; H04W 52/58; H04W 88/02
USPC .......................................................... 455/522
See application file for complete search history.

(56) References Cited

U.S. PATENT DOCUMENTS 7,570,957 B2 *  8/2009  Atarashi et al. ............ 455/456.1
2002/0003833 A1 *  1/2002  Usuda et al. ................. 375/144

(Continued)

FOREIGN PATENT DOCUMENTS

JP    2004-248206 A    9/2004
JP    2008-167031 A    7/2008

OTHER PUBLICATIONS

3GPP TS 36.213 V8.2.0, Mar. 2008, 3rd Generation Partnership Project; Technical Specification Group Radio Access Network; Evolved Universal Terrestrial Radio Access (E-UTRA); Physical layer procedures (Release 8), referring to pp. 8-11, 30 pages.
International Search Report issued in PCT/JP2009/066342, mailed on Nov. 17, 2009, 1 page.

(Continued)

*Primary Examiner* — Bobbak Safaipour
(74) *Attorney, Agent, or Firm* — Osha Liang LLP

(57) ABSTRACT

To provide a transmission power control method, base station apparatus and mobile station apparatus for enabling the transmission power in the mobile station apparatus having a plurality of antennas to be properly controlled, enabled is one of a common control mode for transmitting a common TPC command to perform transmission power control common to antennas (102a, 102b) to the mobile station apparatus (100) and an individual control mode for transmitting individual TPC commands to perform transmission power control individually on the antennas (102a, 102b) to the mobile station apparatus (100).

16 Claims, 18 Drawing Sheets

(56) References Cited

U.S. PATENT DOCUMENTS

| | | | |
|---|---|---|---|
| 2003/0162551 A1* | 8/2003 | Atarashi et al. | 455/456 |
| 2009/0135940 A1* | 5/2009 | Imamura | 375/267 |
| 2009/0247210 A1* | 10/2009 | Sahara | 455/522 |
| 2013/0100842 A1* | 4/2013 | Nishikawa et al. | 370/252 |

OTHER PUBLICATIONS

Written Opinion issued in PCT/JP2009/066342, mailed on Nov. 17, 2009, 5 pages.

Notification of Reasons for Rejection for Japanese Patent Application No. 2009-106649 mailed Apr. 24, 2012, with English translation thereof (5 pages).

* cited by examiner

TPC MODE INFORMATION
(COMMON CONTROL MODE)

·SETTING FLAG  COMMON/INDIVIDUAL (0/1)
 0

TPC MODE INFORMATION
(INDIVIDUAL CONTROL MODE)

·SETTING FLAG  COMMON/INDIVIDUAL (0/1)
 1

FIG. 14

TRANSMISSION POWER CONTROL METHOD, BASE STATION APPARATUS AND MOBILE STATION APPARATUS

TECHNICAL FIELD

The present invention relates to a transmission power control method, base station apparatus and mobile station apparatus for controlling uplink transmission power.

BACKGROUND ART

In uplink of W-CDMA, since user equipments (UE) in the same cell use scramble codes specific to users and reception is non-orthogonal, fast transmission power control (TPC) is essential to reduce the effect of multi-user interference (i.e. the near-far problem).

Meanwhile, in the LTE (Long Term Evolution) system defined by 3 GPP Release 8 (hereinafter, referred to as "Rel-8 LTE"), in uplink is adopted SC-FDMA (Single-Carrier Frequency Division Multiple Access) radio access that actualizes low Peak-to Average Power Ratio (PAPR) and that is effective at increasing coverage. Accordingly, by scheduling by the base station apparatus, basically, since radio resources having some frequency and time are allocated to a UE, orthogonality in the frequency and time domains is achieved among users in the same cell. Therefore, from the viewpoint of suppressing multi-user interference in the same cell, fast TPC is not always essential. However, in Rel-8 LTE, since frequency is reused per one-cell, interference from adjacent cells is significant, and particularly, the interference level from the UE existing at the cell edge is high. Therefore, it is necessary to apply TPC also in LTE to compensate for such adjacent-cell interference and maintain certain reception quality.

In uplink of Rel-8 LTE are defined 1) Physical Random Access Channel (PRACH), 2) Physical Uplink Shared Channel (PUSCH), and 3) Physical Uplink Control Channel (PUCCH). Particularly, the PUSCH is a physical channel to transmit user data, and to the PUSCH is applied adaptive modulation and channel coding (AMC) corresponding to the reception channel state of the UE and frequency scheduling for assigning frequency blocks with high reception signal levels to each user optimally corresponding to reception channel states of a plurality of users. To respond to the instantaneous fading variation, fast frequency scheduling and fast AMC is executed for each TTI (Transmission Time Interval) with a length of 1 msec. In this case, it is possible to respond to the instantaneous fading variation by adaptive rate control by AMC, and slow TPC is used to respond to propagation loss from the base station apparatus and variations in adjacent-cell interference. The transmission power control of the PUSCH in uplink is controlled by a combination of open-loop TPC performed by parameters (Po, α, etc.) notified from the base station apparatus at relatively long intervals and a propagation loss value measured by the mobile station apparatus, and closed-loop TPC by TPC command notified at relatively short intervals to compensate for intermediate variations in the reception level due to shadowing and a setting error in transmission power in the UE (3GPP, TS36. 213). In closed-loop TPC performed between the base station apparatus and mobile station apparatus, for example, the base station apparatus calculates a difference between the reception SINR (Signal to Interference plus Noise Ratio) averaged by averaging time t and target reception SINR, notifies the mobile station apparatus of the difference as a TPC command, and thus controls the transmission power of the mobile station apparatus.

CITATION LIST

Non-Patent Literature

[Non-patent Literature 1] 3GPP, TS 36.213, V8.2.0, "Evolved Universal Terrestrial Radio Access (E-UTRA); Physical layer procedures"

SUMMARY OF INVENTION

Technical Problem

However, although uplink transmission by a plurality of antennas is assumed in LTE-Advanced, a single TPC command has conventionally been assigned to one UE. Accordingly, when slow TPC is performed, since it is not necessary to provide the antennas with transmission power differences, it is possible to perform transmission power control on all the antennas using the same TPC command. Meanwhile, when fast TPC for tracking instantaneous fading variations is performed, there has been the problem that the same TPC command for all the antennas does not permit transmission power control meeting the required reception quality. Further, in uplink transmission by a plurality of antennas, there is a requirement to compensate for a reception level difference in the base station apparatus for each antenna.

The present invention was made in view of the respect, and it is an object of the invention to provide a transmission power control method, base station apparatus and mobile station apparatus for enabling the transmission power in the mobile station apparatus having a plurality of antennas to be properly controlled.

Solution to Problem

A transmission power control method of the invention is a transmission power control method for controlling uplink transmission power, and is characterized by enabling one of a common control mode for controlling transmission power of a plurality of antennas using a transmission power control signal common to the antennas for a mobile station apparatus having the plurality of antennas, and an individual control mode for controlling transmission power of the plurality of antennas using transmission power control signals for individual antennas for the mobile station apparatus.

According to this configuration, when it is not necessary to track instantaneous fading, the common control mode is set, and a transmission power control signal common to the antennas is transmitted to the mobile station apparatus to control the transmission power of a plurality of antennas. When it is necessary to track instantaneous fading, the individual control mode is set, transmission power control signals for individual antennas are transmitted to the mobile station apparatus, and it is possible to control the transmission power for each antenna. Thus, by enabling the control mode in response to the communication environment, it is possible to control the mobile station apparatus having a plurality of antennas to have proper transmission power.

Further, the invention is characterized in that in the aforementioned transmission power control method, a reception level difference signal is generated based on a reception level difference among the plurality of antennas of the mobile station apparatus, and is transmitted to the mobile station apparatus.

According to the constitution, the reception level difference signal is transmitted to the mobile station apparatus, and the reception level difference among a plurality of antennas is identified in the mobile station apparatus. Accordingly, the mobile station apparatus is capable of setting various kinds of processing for compensating for the reception level difference among a plurality of antennas.

Technical Advantage of the Invention

According to the invention, it is possible to properly control the transmission power of a mobile station apparatus having a plurality of antennas.

BRIEF DESCRIPTION OF DRAWINGS

FIG. 14 is a diagram illustrating the Embodiment of the transmission power control method according to the invention, and is a diagram showing an example of TPC mode information;

DESCRIPTION OF EMBODIMENTS

Embodiments of the invention will specifically be described below with reference to accompanying drawings. In addition, the Embodiments describe examples in which the invention is applied to LTE-Advanced, but the invention is not limited to the case of being applied to LTE-Advanced.

Figure 1:
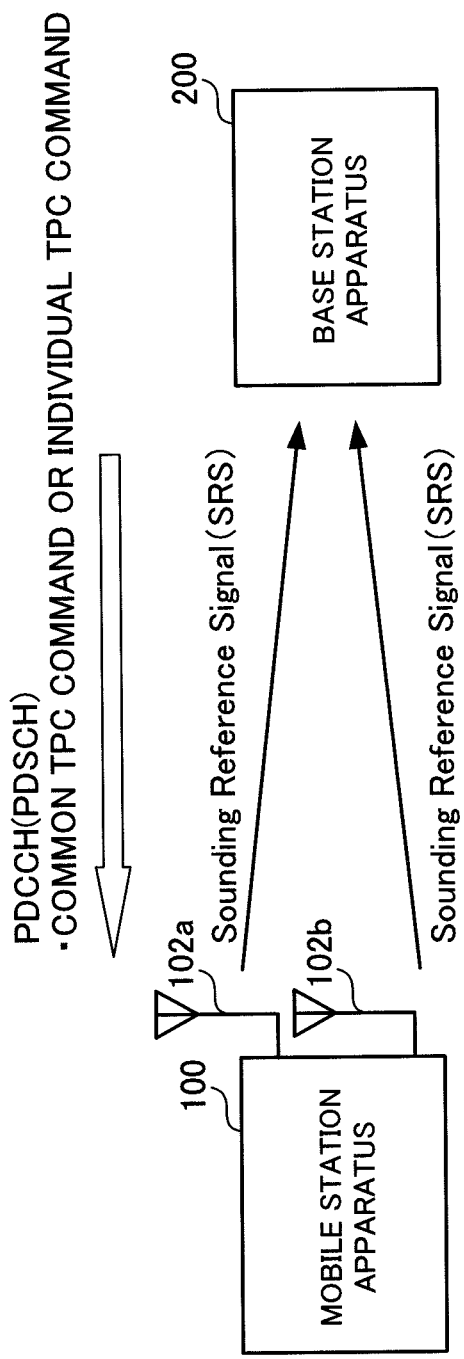
FIG. 1 is a diagram illustrating an Embodiment of a transmission power control method according to the invention, and is an explanatory view of the outline of transmission power control for a base station apparatus to perform on a mobile station apparatus.

FIG. 1 is an explanatory view of the outline of transmission power control for a base station apparatus to perform on a mobile station apparatus in an Embodiment of the invention.

As shown in FIG. 1, a mobile station apparatus 100 has two antennas, 102a, 102b, and via two antennas, 102a, 102b, receives downlink signals from a base station apparatus 200, while transmitting uplink signals to the base station apparatus 200. Using an uplink Sounding Reference Signal (SRS), etc. received from the mobile station apparatus 100, the base station apparatus 200 measures the reception SINR (Signal to Interference plus Noise Ratio) for each of the antennas 102a, 102b of the mobile station apparatus 100, and generates a TPC command from a difference between the reception SINR and beforehand set target reception SINR. The generated TPC command is notified to the mobile station apparatus 100 on the PDCCH (Physical Downlink Control Channel), and the transmission power of the mobile station apparatus 100 is controlled.

Further, the base station apparatus 200 has a common control mode for transmitting a TPC command common to the antennas 102a, 102b of the mobile station apparatus 100, and an individual control mode for transmitting an individual TPC command for each of the antennas 102a, 102b of the mobile station apparatus 100. In the common control mode, a common TPC command is generated from a difference between the average value of reception SINR corresponding to two antennas, 102a, 102b, and target reception SINR, and is notified to the mobile station apparatus 100, and all the antennas 102a, 102b of the mobile station apparatus 100 are set for common transmission power. Meanwhile, in the individual control mode, an individual TPC command is generated from a difference between the reception SINR of each of two antennas, 102a, 102b, and target reception SINR, and is notified to the mobile station apparatus 100, and two antennas, 102a, 102b, of the mobile station apparatus 100 are set for individual transmission power.

Furthermore, the base station apparatus 200 may monitor the moving speed of the mobile station apparatus 100 to switch between the common control mode and the individual control mode corresponding to the moving speed of the mobile station apparatus 100. When it is not necessary to track instantaneous fading, for example, in the case that the moving speed of the mobile station apparatus 100 is low or the like, the common control mode is enabled. Meanwhile, when it is necessary to track instantaneous fading, for example, in the case that the moving speed of the mobile station apparatus 100 is high or the like, the individual control mode is enabled. In this case, the base station apparatus 200 stores reference speed that is a criterion for speed, and enables the common control mode when the speed is lower than the reference speed, while enabling the individual control mode when the speed is higher than the reference speed.

Meanwhile, the base station apparatus 200 may switch to the individual control mode only in the predetermined speed range. In this case, the base station apparatus 200 stores upper limit and lower limit reference speeds that are criteria for the speed range, and enables the individual control mode when the moving speed of the mobile station apparatus 100 is in the range from the lower limit reference speed to the upper limit reference speed. In addition, the upper limit and lower limit reference speeds are capable of being set as appropriate, and particularly, it is possible to set the upper limit reference speed as appropriate in consideration of control delay when control delay occurs to the extent that the TPC command is not able to track. By this means, when the moving speed of the mobile station apparatus 100 is too high and the TPC command is not able to track, it is possible to prevent resources from being wasted due to switching to the individual control mode.

Alternately, the base station apparatus 200 may monitor a reception level difference caused by transmission power setting error or the like for each of two antennas, 102a, 102b, of the mobile station apparatus 100 i.e. an average reception power difference between the antennas 102a, 102b in the base station apparatus 200 to switch between the common control mode and the individual control mode corresponding to the average reception power difference. For example, when the average reception power difference between the antennas 102a, 102b is large, the individual control mode is enabled in consideration of the power difference. In this case, the base station apparatus 200 stores a reference power difference that is a criterion for the power difference, and enables the common control mode when the difference is smaller than the reference power difference, while enabling the individual control mode when the difference is larger than the reference power difference.

Herein, referring to FIGS. 2 to 6, data configurations will be described in which an individual TPC command notified from the base station apparatus to the mobile station apparatus on the PDCCH is added. In addition, in FIGS. 2 to 6, the left side as viewed shows a data configuration of LTE as a conventional example, and the right side as viewed shows a data configuration of LTE-Advanced to which the invention is applied. Further, a data configuration with a common TPC command added thereto is the same as the conventional data configuration, and descriptions thereof are omitted. Hereinafter, in this Embodiment, four, first to fourth, data configurations will be described, but the configurations are illustrative, and the data configuration is not limited to these four configurations. Further, in this Embodiment, among the first to fourth data configurations, any one of the data configurations may be used, or some of the data configurations may be combined to use corresponding to the communication environment.

Figure 2:
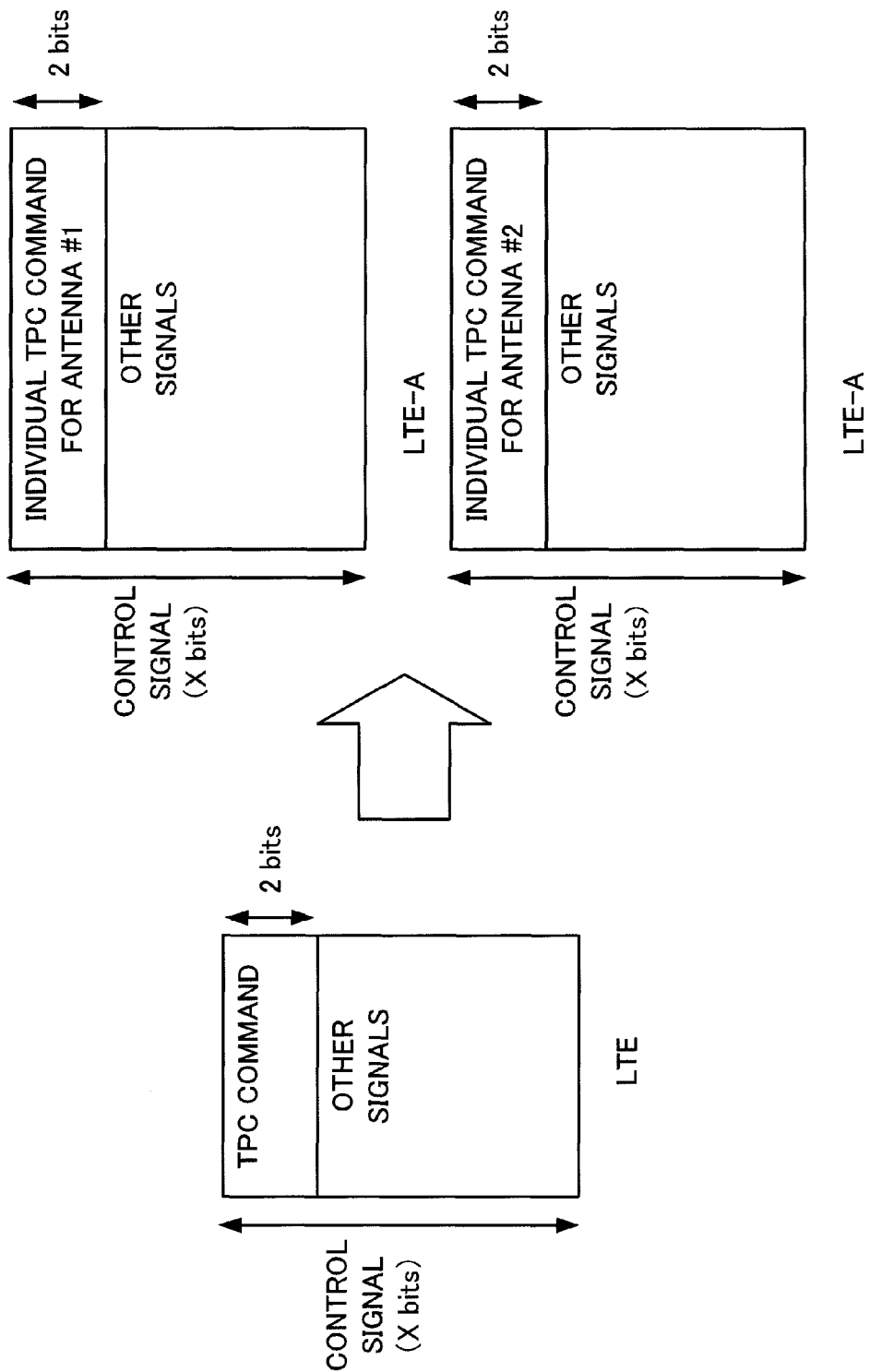
FIG. 2 is a diagram illustrating the Embodiment of the transmission power control method according to the invention, and is a diagram illustrating a first data configuration.

FIG. 2 shows the first data configuration in which an individual TPC command corresponding to one antenna is added to one item of transmission data. As shown on the right side shown in FIG. 2, an individual TPC command on the antenna 102a side is added to one item of transmission data, and an individual TPC command on the antenna 102b side is added to another item of transmission data. At this point, the number of bits of the individual TPC command in the first data configuration is the same as that of the TPC command of the conventional example as shown on the left side shown in the figure and is two (2 bits), and therefore, the total number of bits of transmission data in the first data configuration is the same as the total number of bits of transmission data of the conventional example. Accordingly, it is possible to control the transmission power with the signaling amount suppressed.

In addition, since one individual TPC command is added to one item of transmission data, the number of transmission times increases corresponding to the number of antennas, 102a, 102b, of the mobile station apparatus 100, and the transmission interval is two times the transmission interval of the TPC command of the conventional example. Thus, in the first data configuration, the total number of bits of each transmission data is the same as the total number of bits of transmission data of the conventional example, the transmission interval is larger than that of the conventional example, and therefore, the first data configuration is effective when the transmission power is controlled with the signaling amount given a higher priority than the transmission interval.

Figure 3:
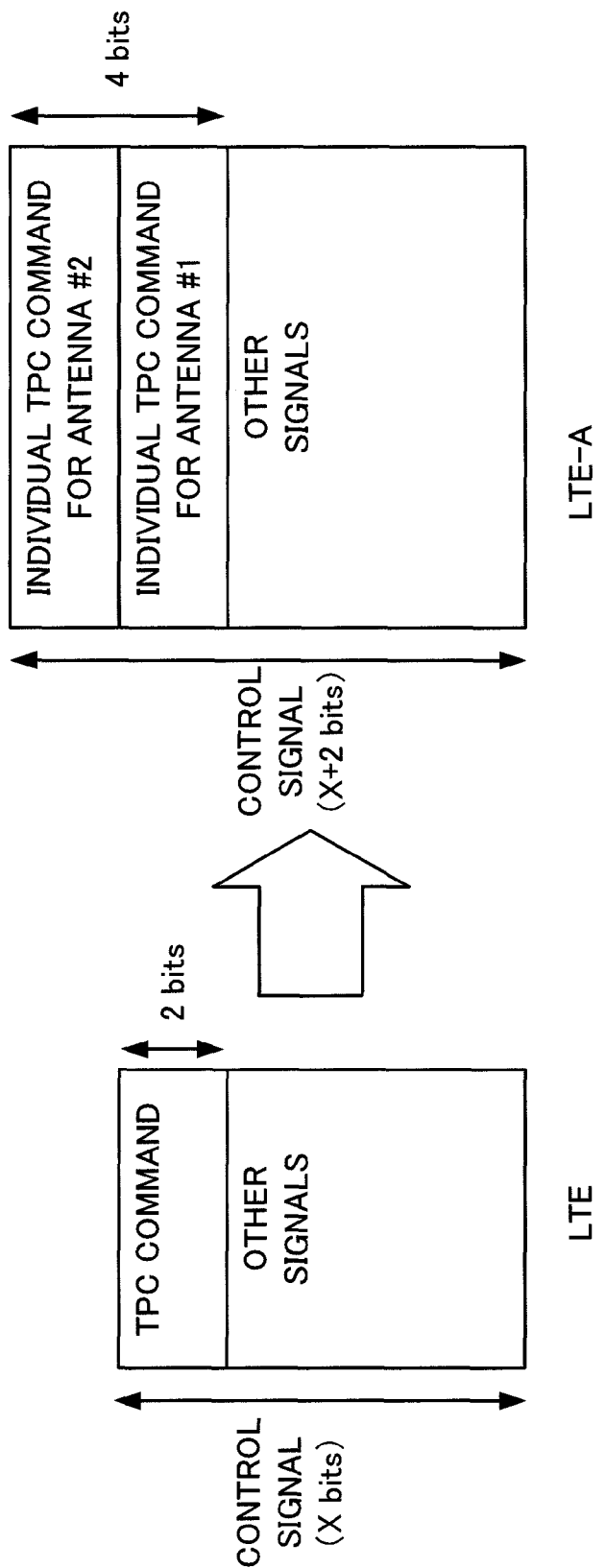
FIG. 3 is a diagram illustrating the Embodiment of the transmission power control method according to the invention, and is a diagram illustrating a second data configuration.

FIG. 3 shows the second data configuration in which individual TPC commands corresponding to two antennas are added to one item of transmission data. As shown on the right side shown in FIG. 3, one item of transmission data is given an individual TPC command on the antenna 102a side and an individual TPC command on the antenna 102b side. In this case, the number of bits of each of the individual TPC command on the antenna 102a side and the individual TPC command on the antenna 102b side in the second data configuration is the same as that of the TPC command of the conventional example as shown on the left side shown in the figure, and is two (2 bits), and therefore, the total number of bits of transmission data in the second data configuration is higher than the total number of bits of transmission data of the conventional example by 2 bits.

Figure 4:
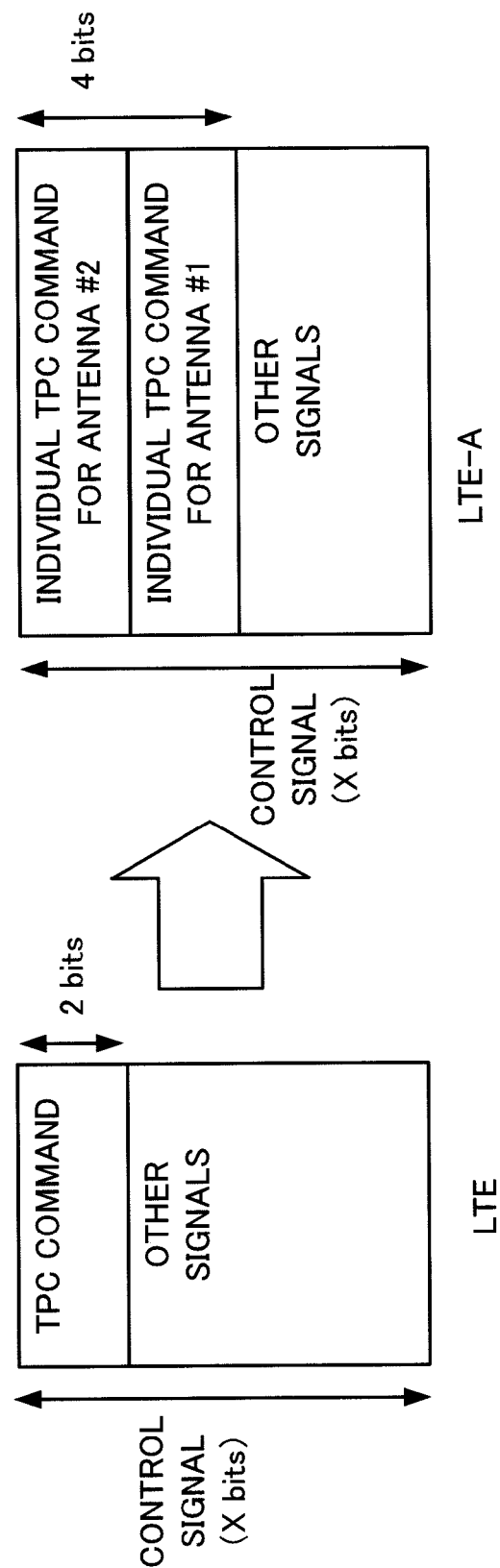
FIG. 4 is a diagram illustrating the Embodiment of the transmission power control method according to the invention, and is a diagram illustrating a modification of the second data configuration.

Further, since individual TPC commands of two antennas, 102a, 102b, are added to one item of transmission data and it is possible to transmit a plurality of individual TPC commands at a time, the transmission interval is the same as the transmission interval of the conventional TPC command. Thus, in the second data configuration, the total number of bits of the transmission data is higher than the total number of conventional transmission data, the transmission interval is the same as that in the conventional example, and therefore, the second data configuration is effective when transmission power is controlled with the transmission interval given a higher priority than the signaling amount. In this case, as shown in FIG. 4, by reducing the area of other signals, or using a vacant area, it is possible to make the total number of bits of transmission data of this Embodiment the same as the total number of bits of transmission data of the conventional example.

Figure 5:
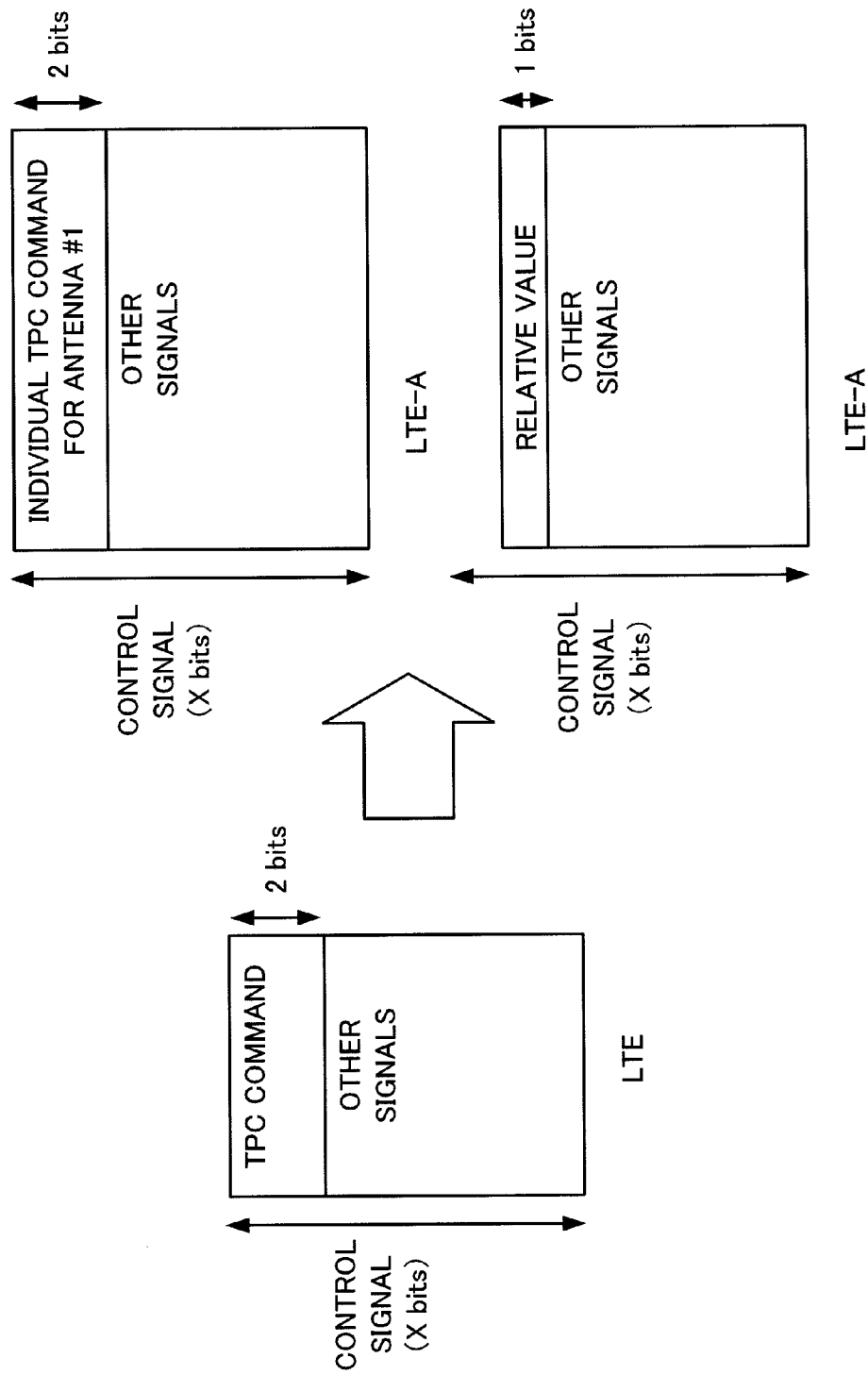
FIG. 5 is a diagram illustrating the Embodiment of the transmission power control method according to the invention, and is a diagram illustrating a third data configuration.

FIG. 5 shows the third data configuration in which a reference individual TPC command for one antenna is added to prior transmission data, and subsequent transmission data is given a relative value between the reference individual TPC command and an individual TPC command for the other one of the antennas. As shown on the right side shown in FIG. 5, the prior transmission data is given the individual TPC command on the antenna 102a side that is a reference, and the subsequent transmission data is given the relative value between the individual TPC command on the antenna 102a side that is a reference and the individual TPC command on the antenna 102b side.

At this point, the number of bits of the individual TPC command on the antenna 102a side as a reference added to the prior transmission data in the third data configuration is the same as that of the conventional TPC command as shown on the left side shown in the figure and is two (2 bits), and therefore, the total number of bits of prior transmission data in the third configuration is the same as the total number of bits of conventional transmission data. Meanwhile, the relative value added to subsequent transmission data in the third data configuration is lower than the conventional TPC command by one bit, and therefore, the total number of bits of subsequent transmission data in the third data configuration is lower than the total number of bits of conventional transmission data by one bit. Accordingly, it is possible to control the transmission power with the signaling amount suppressed in the subsequent transmission data.

In addition, since an individual TPC command for the antenna 102a is added to prior transmission data, and a relative value to control the transmission power of the antenna 102b is added to subsequent transmission data, the number of transmission times increases corresponding to the number of antennas, 102a, 102b, of the mobile station apparatus 100, and the transmission interval is two times the transmission interval of the TPC command of the conventional example. Thus, in the third data configuration, subsequent transmission data is given a relative value as a substitute for the individual TPC command on the antenna 102b side, and therefore, the third data configuration is effective when the transmission power is controlled with the signaling amount suppressed more than in the first data configuration.

Figure 6:
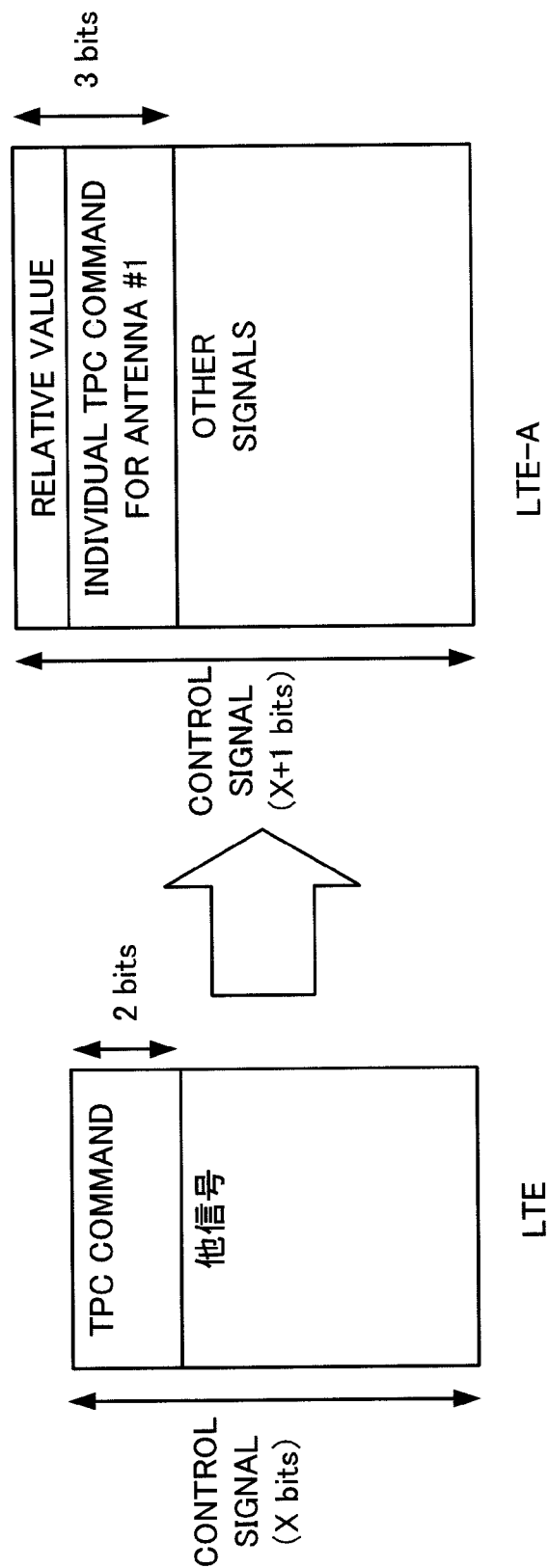
FIG. 6 is a diagram illustrating the Embodiment of the transmission power control method according to the invention, and is a diagram illustrating a fourth data configuration.

FIG. 6 shows the fourth data configuration in which one item of transmission data is given a reference individual TPC command for one antenna, and a relative value between the reference individual TPC command and an individual TPC command for the other one of the antennas. As shown on the right side shown in FIG. 6, one item of transmission data is given the individual TPC command on the antenna 102a side that is a reference, and a relative value between the individual TPC command on the antenna 102a side that is a reference and the individual TPC command on the antenna 102b side. At this point, the individual TPC command on the antenna 102a side as a reference in the fourth data configuration is of 2 bits, the relative value is of 1 bit, and therefore, the total number of bits of transmission data in the fourth data configuration is higher than the total number of bits of conventional transmission data by 1 bit.

Further, since one item of data is given an individual TPC command for the antenna 102a, and a relative value to control the transmission power of the antenna 102b, and it is possible to transmit the individual TPC command and the relative value at a time, the transmission interval is the same as the transmission interval of the TPC command of the conventional example. Thus, in the fourth data configuration, a relative value is added to transmission data as a substitute for the individual TPC command on the antenna 120b side, and therefore, the fourth data configuration is effective when the transmission power is controlled with the signaling amount suppressed more than in the second data configuration.

Figure 7:
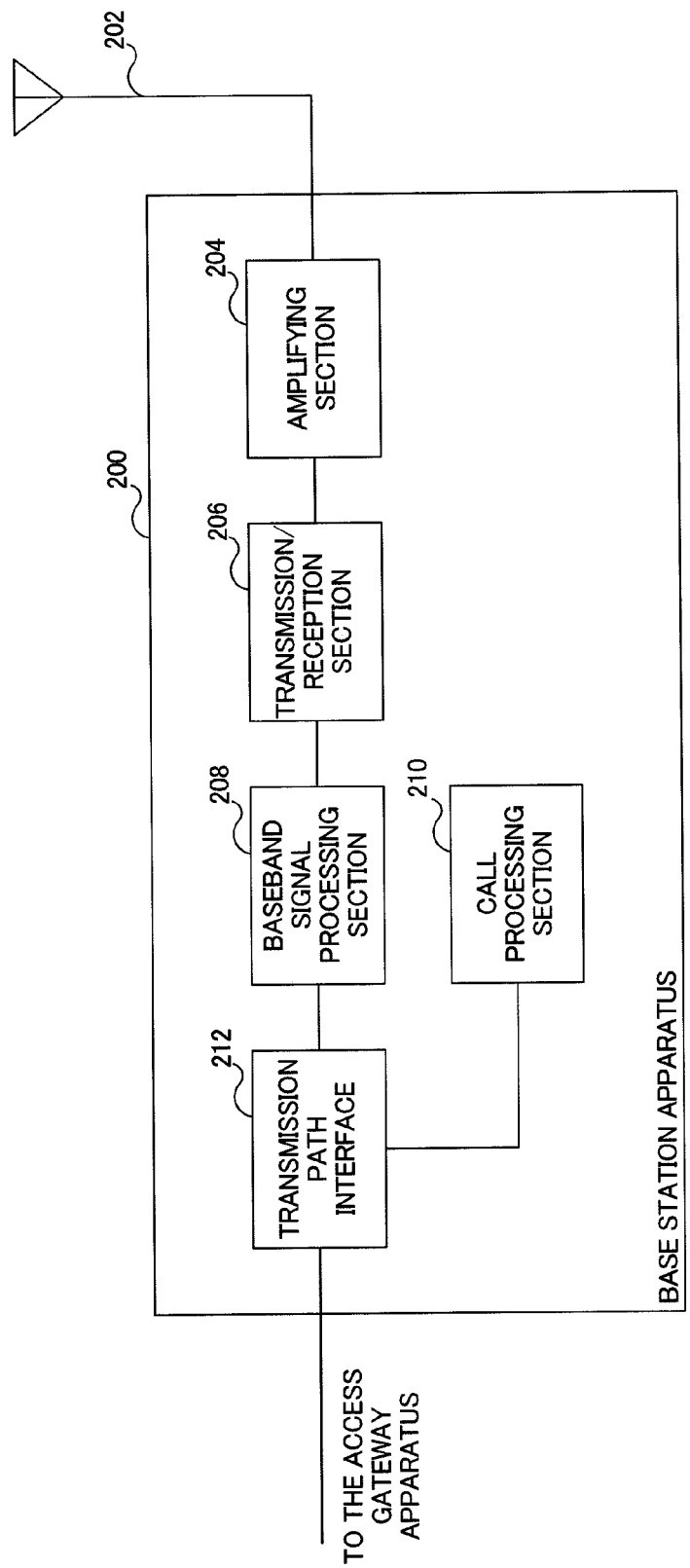
FIG. 7 is a diagram illustrating the Embodiment of the transmission power control method according to the invention, and is a functional block diagram of the base station apparatus.

A functional configuration of the base station apparatus will be described next with reference to FIG. 7. FIG. 7 is a functional block diagram of the base station apparatus according to the Embodiment of the invention.

As shown in FIG. 7, the base station apparatus 200 is comprised of a plurality of antennas 202 (only one is shown in the figure), amplifying section 204, transmission/reception section 206, baseband signal processing section 208, call processing section 210 and transmission path interface 212.

For uplink data, a radio frequency signal received in the antenna 202 is amplified in the amplifying section 204 so that the reception power is corrected to certain power under AGC. The amplified radio frequency signal is converted in frequency into a baseband signal in the transmission/reception section 206. This baseband signal is subjected to despreading, RAKE combining, and error correcting decoding in the baseband signal processing section 208, and then, transferred to an access gateway apparatus, not shown in the figure, via the transmission path interface 212. The access gateway apparatus is connected to a core network, and manages each mobile station. Further, for the uplink, based on an uplink baseband signal, the base station apparatus 200 measures the reception SINR and interfere level of the received radio signal.

The downlink data is input to the baseband signal processing section 208 from an upper apparatus via the transmission path interface 212. The baseband signal processing section 208 performs processing of retransmission control (H-ARQ (Hybrid ARQ)), scheduling, transmission format selection, channel coding and spreading processing on the data to output to the transmission/reception section 206. The transmission/reception section 206 converts in frequency the baseband signal output from the baseband signal processing section 208 to a radio frequency signal, and then, the signal is amplified in the amplifying section 204 and transmitted from the antenna 202.

Figure 8:
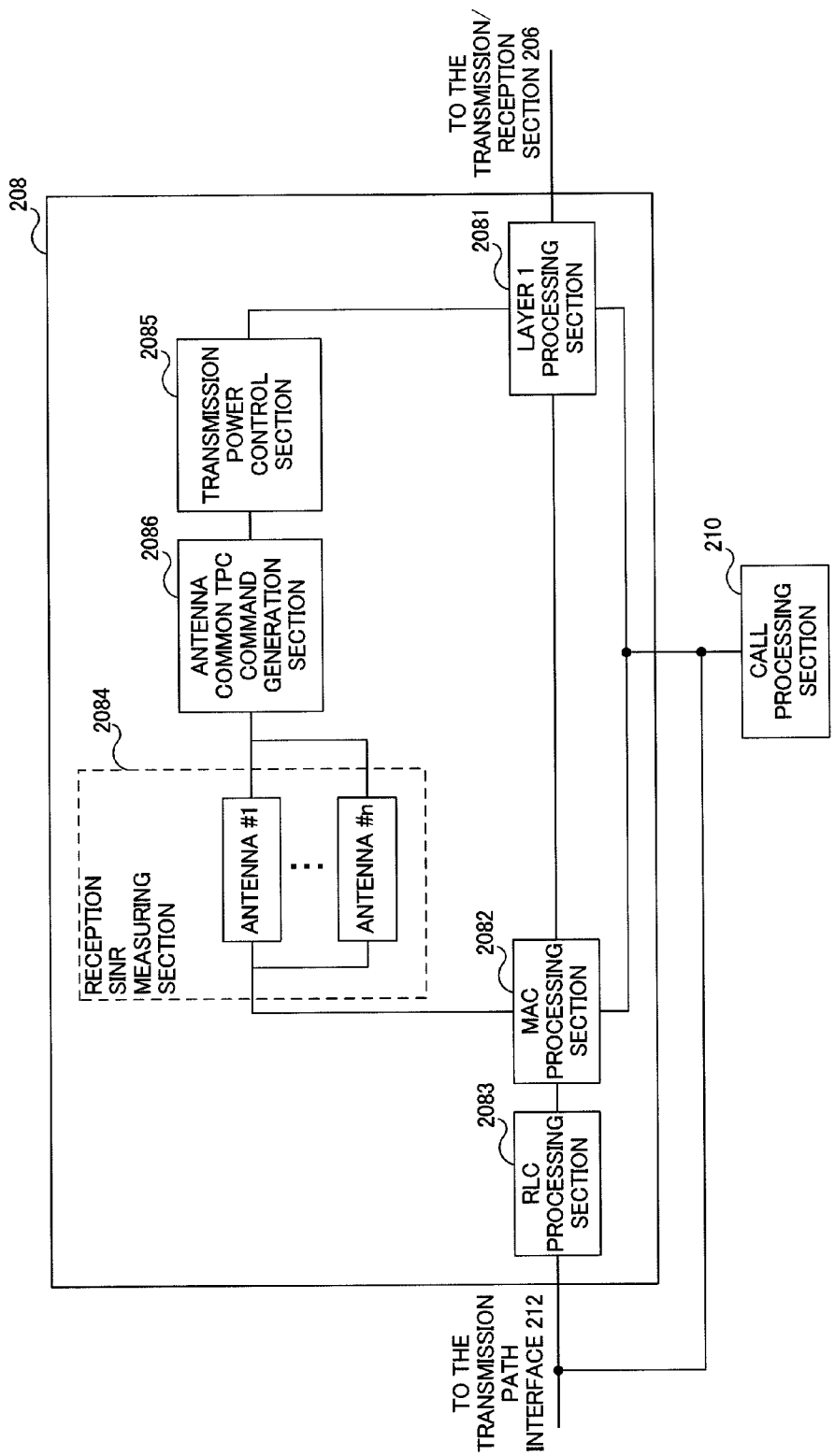
FIG. 8 is a diagram illustrating the Embodiment of the transmission power control method according to the invention, and is a functional block diagram of a baseband signal processing section when a common control mode is effective.

Referring to FIG. 8, described is a functional configuration of the baseband processing section when the common control mode is enabled. FIG. 8 is a functional block diagram of the baseband signal processing section when the common control mode is effective.

As shown in FIG. 8, the baseband signal processing section 208 has a layer 1 processing section 2081, MAC (Medium Access Control) processing section 2082, RLC processing section 2083, reception SINR measuring section 2084, transmission power control section 2085, and antenna common TPC command generating section 2086. In addition, the antenna common TPC command generating section 2086 may be a functional section included in the transmission power control section 2085.

The layer 1 processing section 2081 performs the processing mainly on the physical layer. For example, on a signal received in uplink, the layer 1 processing section 2081 performs the processing such as Fourier transform (FFT), frequency demapping, inverse discrete Fourier transform (IDFT), channel decoding and data demodulation. Meanwhile, on a signal to transmit in downlink, the section 2081 performs the processing such as channel coding, data modulation, frequency mapping and inverse Fourier transform (IFFT).

The MAC processing section 2082 performs the processing such as retransmission control (HARQ) in the MAC layer on signals received in uplink/downlink, scheduling for uplink/downlink, selection of transmission formats of PUSCH/PDSCH (including the determination of MCS set in AMC), and selection of resource blocks for PUSCH/PDSCH.

The RLC processing section 2083 performs segmentation of packets, concatenation of packets, retransmission control in the RLC layer and the like on packets received in uplink and packets which are received via the transmission path interface 212 to transmit in downlink.

The reception SINR measuring section 2084 measures reception quality (for example, reception SINR) of a reference signal received in uplink. Generally, as the reference signal, there are Sounding RS for sounding transmitted regularly in the entire system bands, and Demodulation RS for demodulation transmitted only in the band of specific resource blocks accompanying the PUSCH. The reception SINR measuring section 2084 receives a reference signal for each of the antennas 102a, 102b of the mobile station apparatus 100, and measures the reception SINR for each of the antennas 102a, 102b.

The antenna common TPC command generating section 2086 generates a common TPC command common to the antennas 102a, 102b of the mobile station apparatus 100, based on the reception SINR measured by the reception SINR measuring section 2084. More specifically, the antenna common TPC command generating section 2086 calculates an average value of reception SINR for each of the antennas 102a, 102b of the mobile station apparatus 100, and generates a common TPC command from a difference between the average value of reception SINR and the beforehand stored target reception SINR.

The transmission power control section 2085 performs the processing associated with entire uplink transmission power control such as setting of TPC parameter. Further, the transmission power control section 2085 determines whether to control the antennas 102a, 102b of the mobile station apparatus 100 using a common TPC command or to control the antennas 102a, 102b of the mobile station apparatus 100 using individual TPC commands, and outputs TPC mode information to the layer 1 processing section 2081. The TPC mode information is configured including a setting flag for setting a TPC mode of the mobile station apparatus 100. For example, in an example as shown in FIG. 14, the setting flag is set at "0" in the common control mode, while being set at "1" in the individual control mode. The TPC mode information is notified from the upper layer and transmitted to the mobile station apparatus 100 on the PDCCH or PDCCH.

The call processing section 210 transmits and receives call processing control signals to/from a radio control station as the upper apparatus, and performs state management of the base station apparatus 200 and resource allocation. In addition, the processing in the layer 1 processing section 2081 and the MAC processing section 2082 is performed based on communication conditions between the base station apparatus 200 and mobile station apparatus 100 set in in the call processing section 210.

Figure 9:
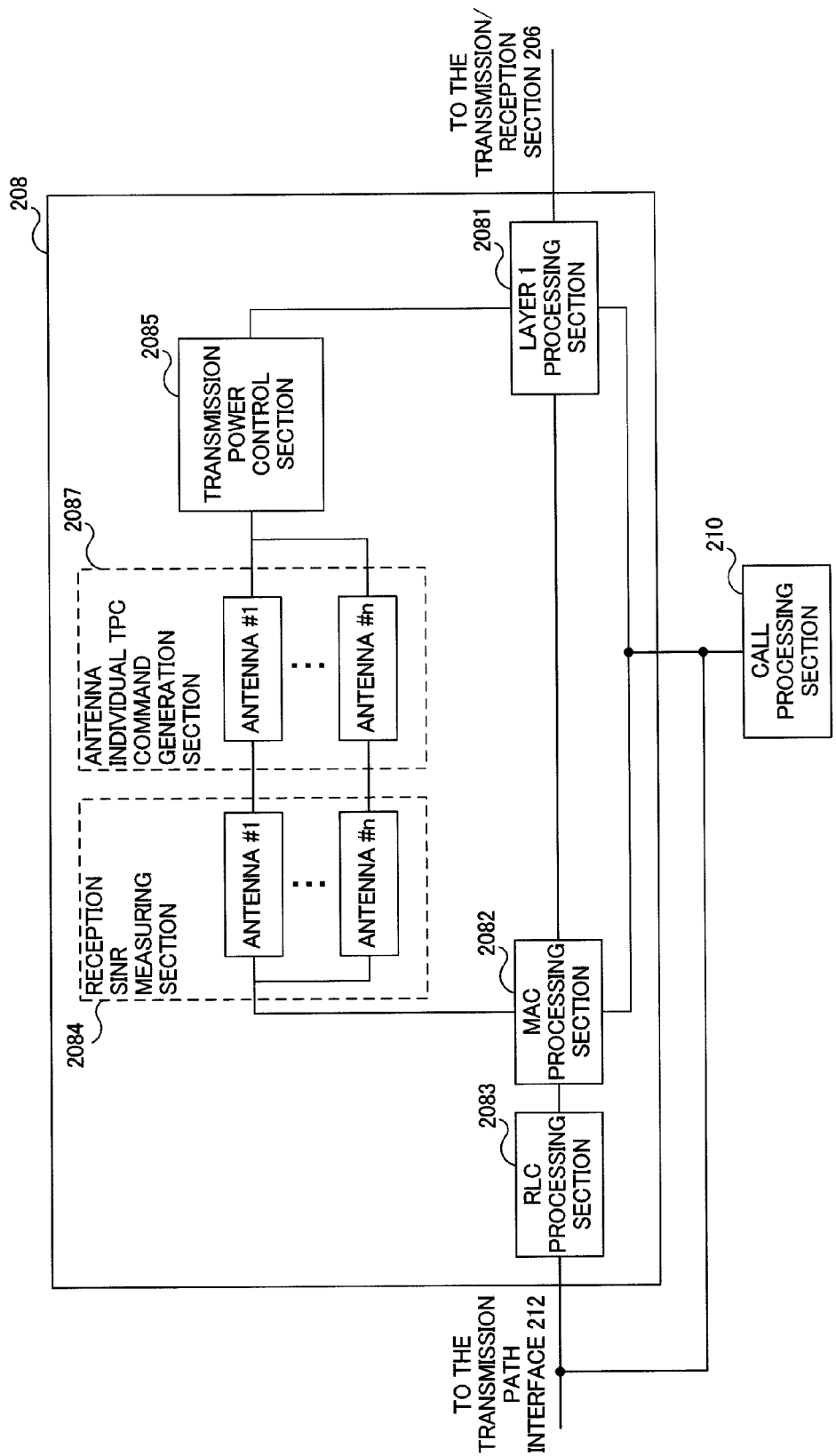
FIG. 9 is a diagram illustrating the Embodiment of the transmission power control method according to the invention, and is a functional block diagram of the baseband signal processing section when an individual control mode is effective.

Referring to FIG. 9, described is a functional configuration of the baseband processing section when the individual control mode is enabled. FIG. 9 is a functional block diagram of the baseband signal processing section when the individual control mode is effective. In addition, the functional block diagram of the baseband signal processing section when the individual control mode is effective differs from the functional block diagram of the baseband signal processing section when the common control mode is effective in the respect of having an antenna individual TPC command generating section as a substitute for the antenna common TPC command generating section. Accordingly, only the difference is described.

An antenna individual TPC command generating section 2087 generates an individual TPC command for each of the antennas 102a, 102b of the mobile station apparatus 100 based on the reception SINR measured in the reception SINR measuring section 2084. More specifically, the antenna individual TPC command generating section 2087 generates the individual TPC command for each of the antennas 102a, 102b from a difference between the reception SINR for each of the antennas 102a, 102b of the mobile station apparatus 100 and the beforehand stored target reception SINR.

Figure 10:
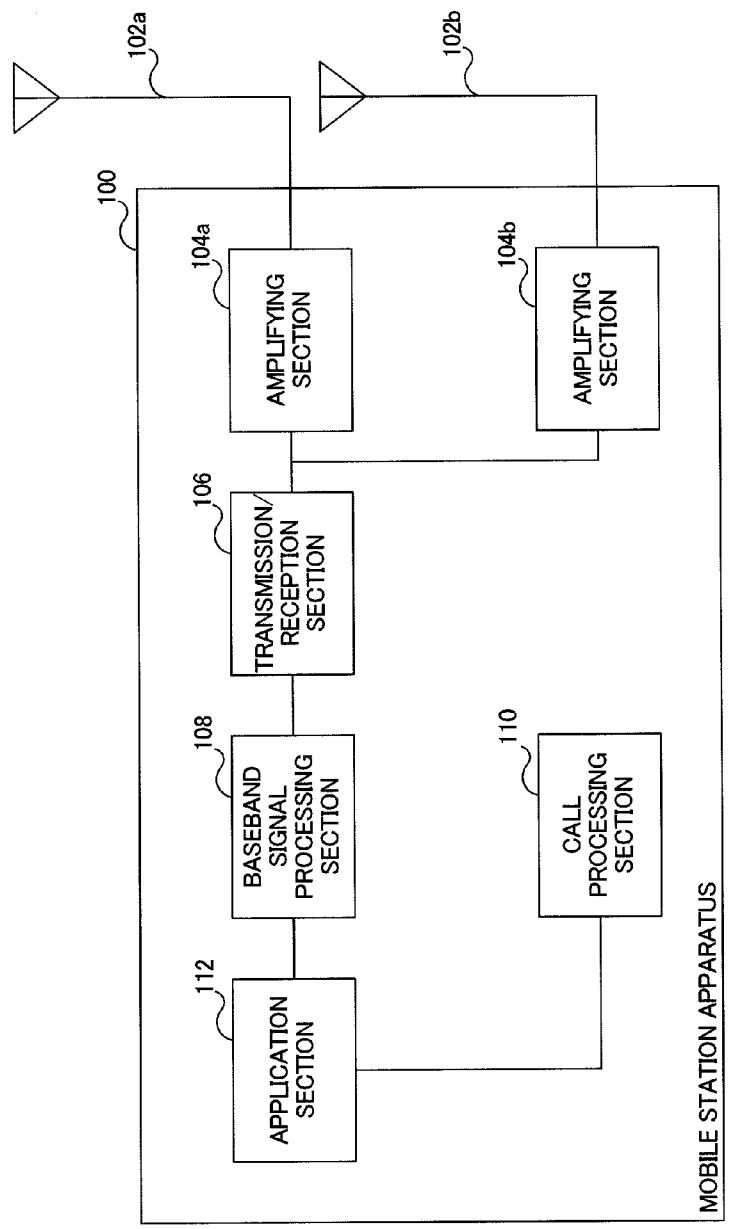
FIG. 10 is a diagram illustrating the Embodiment of the transmission power control method according to the invention, and is a functional block diagram of the mobile station apparatus.

A functional configuration of the mobile station apparatus will be described with reference to FIG. 10. FIG. 10 is a functional block diagram of the mobile station apparatus according to the Embodiment of the invention.

As shown in FIG. 10, the mobile station apparatus 100 is comprised of two antennas, 102a, 102b, amplifying sections 104a, 104b respectively associated with the antennas 102a, 102b, transmission/reception section 106, baseband signal processing section 108, call processing section 110 and application section 112.

The uplink data is input from the application section 112 to the baseband signal processing section 108. The baseband signal processing section 108 performs processing of retransmission control (H-ARQ (Hybrid ARQ)), scheduling, transmission format selection, channel coding and spreading processing on the data to output to the transmission/reception section 106. The transmission/reception section 106 converts in frequency the baseband signal output from the baseband signal processing section 108 to a radio frequency signal, and then, the signals are amplified in the amplifying sections 104a, 104b and transmitted respectively from the antennas 102a, 102b.

For downlink data, radio frequency signals received in the antennas 102a, 102b are respectively amplified in the amplifying sections 104a, 104b so that the reception power is corrected to certain power under AGC. The amplified radio frequency signals are converted in frequency into a baseband signal in the transmission/reception section 106. This baseband signal is subjected to despreading, RAKE combining, and error correcting decoding in the baseband signal processing section 108, and then, transferred to the application section 112.

Figure 11:
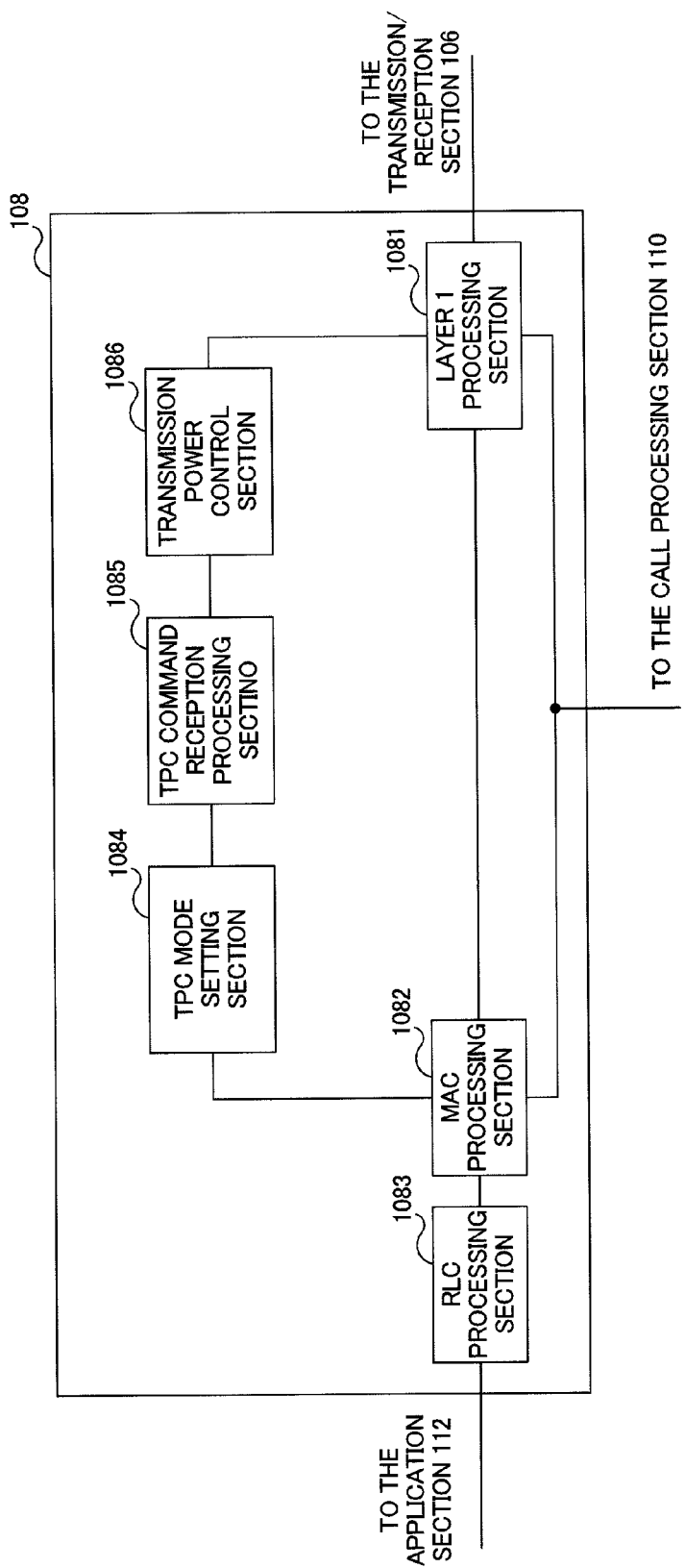
FIG. 11 is a diagram illustrating the Embodiment of the transmission power control method according to the invention, and is a functional block diagram of a baseband signal processing section of the mobile station apparatus.

Referring to FIG. 11, described is a functional configuration of the baseband processing section of the mobile station apparatus. FIG. 11 is a functional block diagram of the baseband signal processing section of the mobile station apparatus.

The baseband signal processing section 108 has a layer 1 processing section 1081, MAC processing section 1082, RLC processing section 1083, TPC command setting section 1084, TPC command reception processing section 1085, and transmission power calculating section 1086.

The layer 1 processing section 1081 performs the processing mainly on the physical layer. For example, on a signal received in downlink, the layer 1 processing section 1081 performs the processing such as Fourier transform (FFT), frequency demapping, inverse discrete Fourier transform (IDFT), channel decoding and data demodulation. Meanwhile, on a signal to transmit in uplink, the section 1081 performs the processing such as channel coding, data modulation, frequency mapping and inverse Fourier transform (IFFT).

The MAC processing section 1082 performs retransmission control (HARQ) in the MAC layer on a signal received in downlink, analysis (identification of transmission format of the PDSCH, and identification of resource blocks of the PDSCH) of scheduling information for downlink, and the like. Further, the MAC processing section 1082 performs MAC retransmission control on a signal to transmit in uplink, analysis (processing such as identification of transmission format of the PUSCH, and identification of resource blocks of the PUSCH) of uplink scheduling information, and the like.

The RLC processing section 1083 performs segmentation of packets, concatenation of packets, retransmission control in the RLC layer and the like on packets received in uplink and packets received from the application section 112 to transmit in downlink.

According to the TPC mode information received in downlink, the TPC mode setting section 1084 sets the common control mode for applying a common TPC command to the antennas 102a, 102b or the individual control mode for applying individual TPC commands to the antennas 102a, 102b.

The TPC command reception processing section 1085 receives the common TPC command/individual TPC commands to identify the command, according to the TPC mode set by the TPC mode setting section 1084.

The transmission power calculating section 1086 calculates the transmission power in uplink according to the TPC command and TPC parameter. In the case of the common control mode, the section 1086 applies the common TPC command to the antennas 102a, 102b and calculates the transmission power. In the case of the individual control mode, the section 1086 applies the individual TPC commands to the antennas 102a, 102b and calculates the transmission power. Then, corresponding to the calculation result of the transmission power calculating section 1086, the amplification factors in the amplifying sections 104a, 104b corresponding to the antennas 102a, 102b are adjusted by AGC, respectively, and the transmission power is controlled.

In addition, in this Embodiment, it is configured that the TPC command reception processing section 1085 receives a TPC signal, the transmission power calculating section 1086 calculates the transmission power, and that the amplifying sections 104a, 104b are controlled. Alternately, the application section 112 may receive the TPC signal, calculate the transmission power, and control the amplifying sections 104a, 104b.

Figure 12:
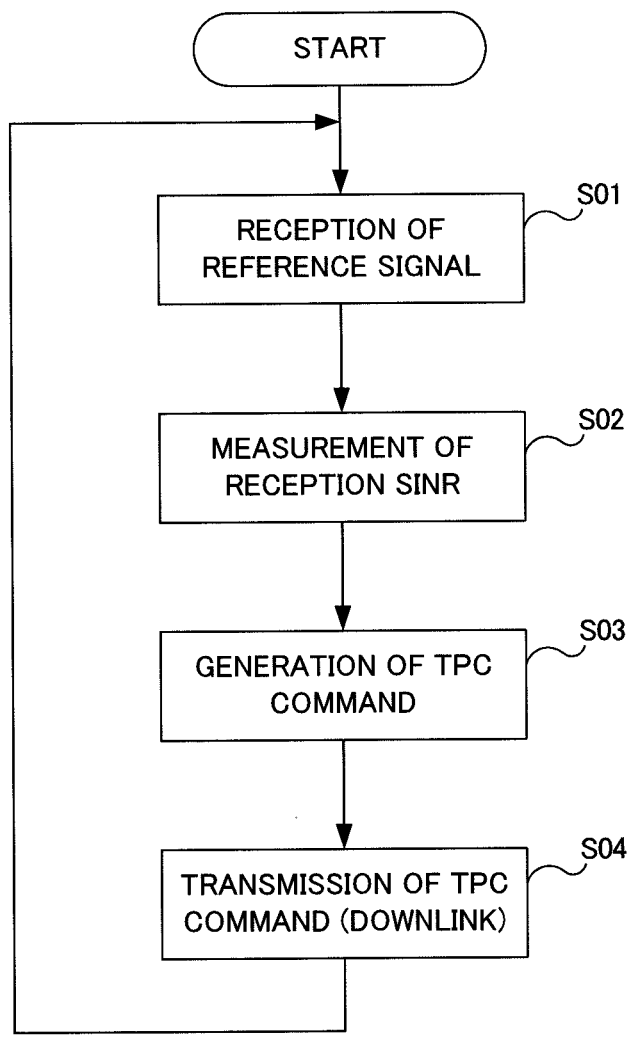
FIG. 12 is a diagram illustrating the Embodiment of the transmission power control method according to the invention, and is a flowchart of transmission power control processing by the base station apparatus.

Referring to FIG. 12, described is the transmission power control processing by the base station apparatus. FIG. 12 is a flowchart of the transmission power control processing by the base station apparatus. In addition, before starting communications, either the common control mode or the individual control mode is enabled in the base station apparatus.

After starting communications, a reference signal transmitted from the mobile station apparatus 100 is received on the PUSCH (step S01), and the reception SINR measuring section 2084 measures the reception SINR of each of the antennas 102a, 102b of the mobile station apparatus 100 as the reception quality (step S02). The measured reception SINR is input to the antenna common TPC command generating section 2086 or the antenna individual TPC command generating section 2087 corresponding to the control mode, and the common TPC command or individual TPC commands are generated (step S03). At this point, for example, the common TPC command is generated from a difference between an average value of the reception SINR for each of the antennas 102a, 102b of the mobile station apparatus and the beforehand stored target reception SINR, and the individual TPC command is generated from a difference between the reception SINR for each of the antennas 102a, 102b of the mobile station apparatus 100 and the beforehand stored target reception SINR. Then, the generated TPC command is transmitted to the mobile station apparatus 100 on the PDCCH (step S04).

Figure 13:
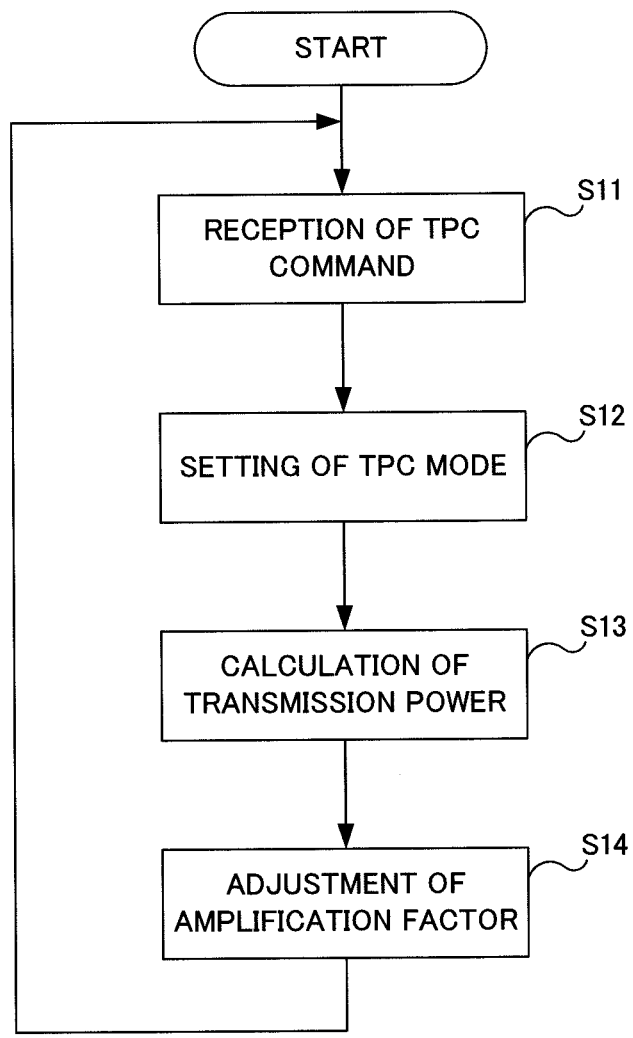
FIG. 13 is a diagram illustrating the Embodiment of the transmission power control method according to the invention, and is a flowchart of transmission power control processing by the mobile station apparatus.

Referring to FIG. 13, described is the transmission power control processing by the mobile station apparatus. FIG. 13 is a flowchart of the transmission power control processing by the mobile station apparatus.

The TPC command transmitted from the base station apparatus 200 is received on the PDCCH (step S11), and corresponding to the beforehand notified TPC mode information, the TPC mode setting section 1084 sets the TPC mode (step S12). When the TPC mode is set, the transmission power calculating section 1086 calculates the transmission power in uplink based on the TPC command and the TPC parameter (step S13), and corresponding to the calculation result, the amplification factors in the amplifying sections 104a, 104b corresponding to the antennas 102a, 102b are adjusted by AGC, respectively (step S14). Thus, the transmission power of the mobile station apparatus is controlled.

As described above, according to the transmission power control method according to this Embodiment, the method has the configuration for enabling either the common control mode for controlling the transmission power using a common TPC command common to two antennas, 102a, 102b, of the mobile station apparatus 100 or the individual control mode for individually controlling the transmission power of two antennas, 102a, 102b, of the mobile station apparatus 100 using individual TPC commands.

Accordingly, when it is not necessary to track instantaneous fading, the common control mode is set, a common TPC command is transmitted to the mobile station apparatus 100, and the transmission power is controlled using the common TPC command common to two antennas, 102a, 102b. When it is necessary to track instantaneous fading, the individual control mode is set, individual TPC commands are transmitted to the mobile station apparatus 100, and it is possible to control the transmission power for each of the antennas 102a, 102b. Further, when an average reception power difference between the antennas 102a and 102b is small in the base station apparatus 200, the common control mode is set, the common TPC command is transmitted to the mobile station apparatus 100, and common control is performed on two antennas, 102a, 102b. When an average reception power difference between the antennas 102a and 102b is large in the base station apparatus 200, the individual control mode is set, individual TPC commands are transmitted to the mobile station apparatus 100, and it is possible to control the transmission power for each of the antennas 102a, 102b. Thus, by enabling the control mode in response to the communication environment, it is possible to control the mobile station apparatus 100 having a plurality of antennas to have proper transmission power.

Described next is another Embodiment of the invention. Transmission power control according to another Embodiment of the invention differs from transmission power control according to the above-mentioned Embodiment only in the respect that the base station apparatus notifies the mobile station apparatus of an average reception level difference. In addition, the functional configurations of the base station apparatus and mobile station apparatus are substantially the same, and therefore, only the functional configurations of the baseband signal processing sections are described. Further, components with the same designations as in transmission power control according to the above-mentioned Embodiment are assigned the same reference numerals to omit descriptions thereof.

Figure 15:
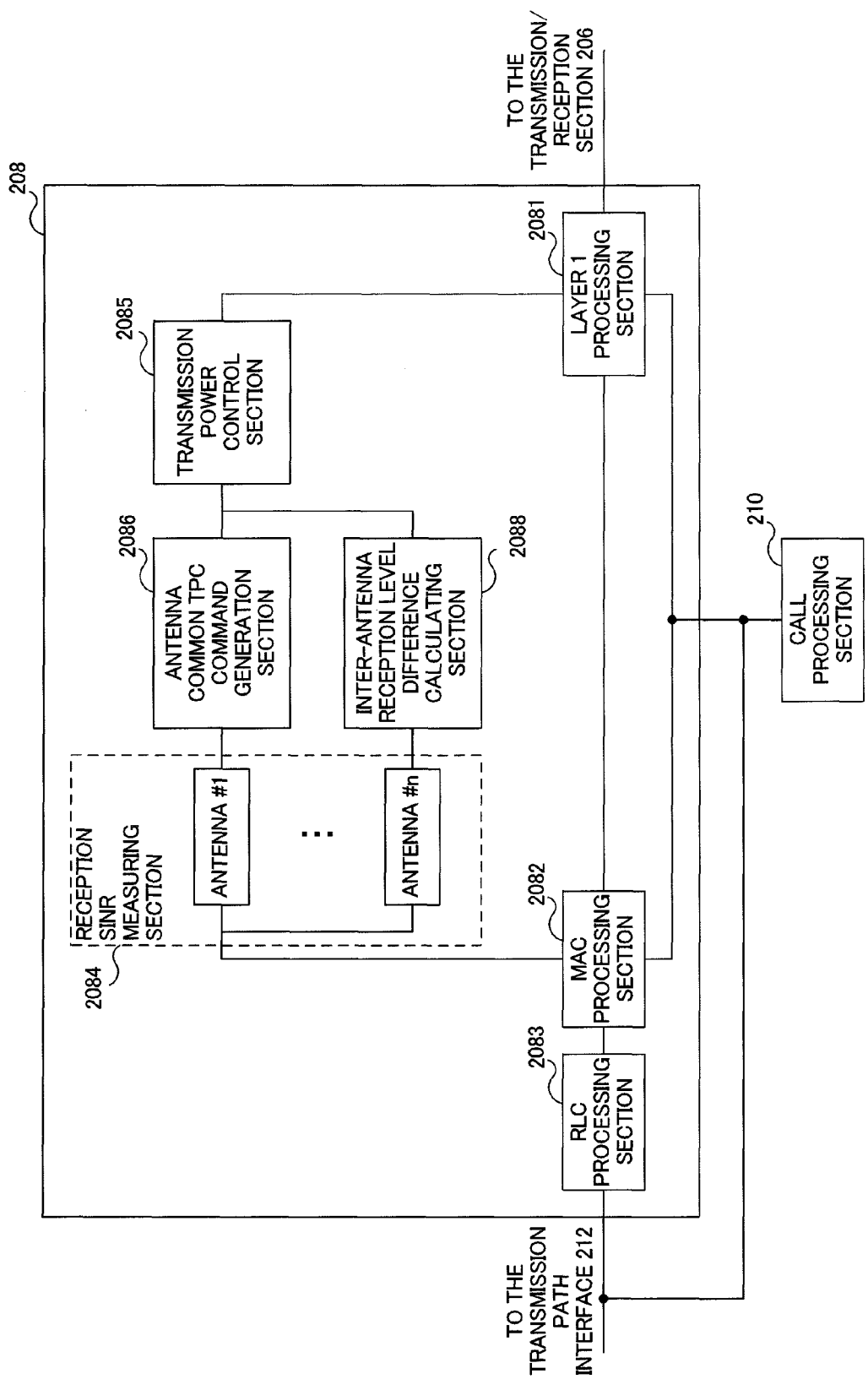
FIG. 15 is a diagram illustrating another Embodiment of the transmission power control method according to the invention, and is a functional block diagram of a baseband signal processing section when the common control mode is effective.

Referring to FIG. 15, described is the functional configuration of the baseband signal processing section when the common control mode is enabled. FIG. 15 is a functional block diagram of the baseband signal processing section when the common control mode is effective.

As shown in FIG. 15, the baseband signal processing section 208 has the layer 1 processing section 2081, MAC (Medium Access Control) processing section 2082, RLC processing section 2083, reception SINR measuring section 2084, transmission power control section 2085, antenna common TPC command generating section 2086, and inter-antenna reception level difference calculating section 2088. In addition, the antenna common TPC command generating section 2086 and inter-antenna reception level difference calculating section 2088 may be a functional section included in the transmission power control section 2085.

The layer 1 processing section 2081 performs the processing mainly on the physical layer. For example, on a signal received in uplink, the layer 1 processing section 2081 performs the processing such as Fourier transform (FFT), frequency demapping, inverse discrete Fourier transform (IDFT), channel decoding and data demodulation. Meanwhile, on a signal to transmit in downlink, the section 2081 performs the processing such as channel coding, data modulation, frequency mapping and inverse Fourier transform (IFFT).

The MAC processing section 2082 performs the processing such as retransmission control (HARQ) in the MAC layer on signals received in uplink/downlink, scheduling for uplink/downlink, selection of transmission formats of PUSCH/PDSCH (including the determination of MCS set in AMC), and selection of resource blocks for PUSCH/PDSCH.

The RLC processing section 2083 performs segmentation of packets, concatenation of packets, retransmission control in the RLC layer and the like on packets received in uplink and packets which are received via the transmission path interface 212 to transmit in downlink.

The reception SINR measuring section 2084 measures reception quality (for example, reception SINR) of a reference signal received in uplink. Generally, as the reference signal, there are Sounding RS for sounding transmitted regularly in the entire system bands, and Demodulation RS for demodulation transmitted only in the band of specific resource blocks accompanying the PUSCH. The reception SINR measuring section 2084 receives a reference signal for each of the antennas 102a, 102b of the mobile station apparatus 100, and measures the reception SINR for each of the antennas 102a, 102b.

The antenna common TPC command generating section 2086 generates a common TPC command common to the antennas 102a, 102b of the mobile station apparatus 100, based on the reception SINR measured by the reception SINR measuring section 2084. More specifically, the antenna common TPC command generating section 2086 calculates an average value of reception SINR for each of the antennas 102a, 102b of the mobile station apparatus 100, and generates a common TPC command from a difference between the average value of reception SINR and the beforehand stored target reception SINR.

The inter-antenna reception level difference calculating section 2088 calculates an average reception level difference between the antennas 102a and 102b of the mobile station apparatus 100 based on the reception SINR measured by the reception SINR measuring section 2084, and generates a reception level difference signal based on the average reception level difference. In this case, the section 2088 calculates a difference with reference to one antenna between the antennas 102a and 102b as an average reception level difference, and includes the antenna number as a reference and the average reception level difference to generate the reception level difference signal. Meanwhile, when an antenna as a reference is beforehand known, the section 2088 may calculate an absolute value of the difference between the antennas 102a and 102b as the average reception level difference, and include the average level difference to generate the reception level difference signal.

The transmission power control section 2085 performs the processing associated with entire uplink transmission power control such as setting of TPC parameter and notification of the reception level difference signal. Further, the transmission power control section 2085 determines whether to control the antennas 102a, 102b of the mobile station apparatus 100 using a common TPC command or to control the antennas 102a, 102b of the mobile station apparatus 100 using individual TPC commands, and outputs the TPC mode information to the layer 1 processing section 2081. The TPC mode information is notified from the upper layer and transmitted on the PDSCH or PDCCH.

Further, based on the average reception level difference between the antennas 102a and 102b, the transmission power control section 2085 determines whether or not to notify the mobile station apparatus 100 of the reception level difference signal. For example, the transmission power control section 2085 stores a reference power difference that is a criterion by which to determine whether or not to notify of the reception level difference signal, and when the average reception level difference between the antennas 102a and 102b is the reference power difference or more, notifies of the reception level difference signal. In this case, the reception level difference signal allows notification intervals by unit of the second, and is preferably transmitted on the PDSCH, but may be transmitted on the PDCCH. In addition, the reception level difference signal may be included in the TPC command and transmitted.

In addition, as described above, when the common control mode and the individual control mode are switched corresponding to the average reception power difference, the reference power difference that is the criterion for control mode switching may be used for the determination whether to notify the reception level difference signal, or another reference power difference differing from the reference power difference that is the criterion for control mode switching may be used for the determination whether to notify the reception level difference signal. When the reference power difference that is the criterion for control mode switching is used for the determination whether to notify the reception level difference signal, it is possible to concurrently determine whether to switch the control mode and whether to notify the reception level difference signal, and it is thereby possible to simplify the determination processing while reducing overhead.

Meanwhile, the mobile station apparatus 100 may be notified of the reception level difference signal only in the case of the common control mode. By this means, even when the reception level difference is large, it is possible to compensate for the reception level difference to some extent without applying the individual control mode, and it is thereby possible to reduce overhead of TPC commands by the individual control mode. Further, in this Embodiment, it is determined whether or not to notify the mobile station apparatus 100 of the reception level difference signal, but the reception level difference signal may be notified to the mobile station apparatus 100 without the determination whether or not to notify the mobile station apparatus 100 of the reception level difference signal.

The call processing section 210 transmits and receives call processing control signals to/from a radio control station as the upper apparatus, and performs state management of the base station apparatus 200 and resource allocation. In addition, the processing in the layer 1 processing section 2081 and the MAC processing section 2082 is performed based on communication conditions between the base station apparatus 200 and mobile station apparatus 100 set in in the call processing section 210.

Figure 16:
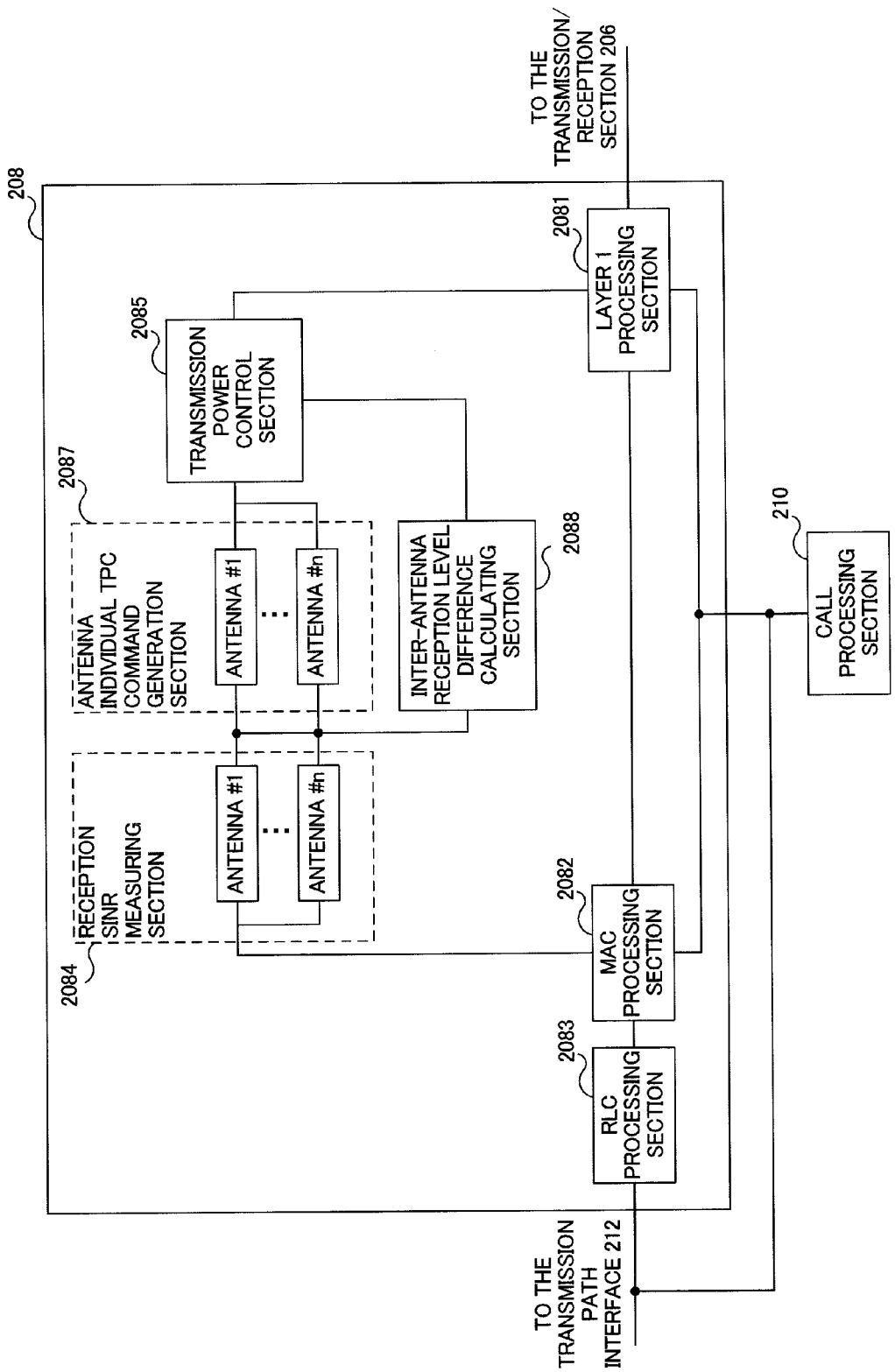
FIG. 16 is a diagram illustrating the another Embodiment of the transmission power control method according to the invention, and is a functional block diagram of the baseband signal processing section when the individual control mode is effective.

Referring to FIG. 16, described is the functional configuration of the baseband processing section when the individual control mode is enabled. FIG. 16 is a functional block diagram of the baseband signal processing section when the individual control mode is effective. In addition, the functional block diagram of the baseband signal processing section when the individual control mode is effective differs from the functional block diagram of the baseband signal processing section when the common control mode is effective in the respect of having the antenna individual TPC command generating section as a substitute for the antenna common TPC command generating section. Accordingly, only the difference is described.

The antenna individual TPC command generating section 2087 generates an individual TPC command for each of the antennas 102a, 102b of the mobile station apparatus 100 based on the reception SINR measured in the reception SINR measuring section 2084. More specifically, the antenna individual TPC command generating section 2087 generates the individual TPC command for each of the antennas 102a, 102b from a difference between the reception SINR for each of the antennas 102a, 102b of the mobile station apparatus 100 and the beforehand stored target reception SINR.

Figure 17:
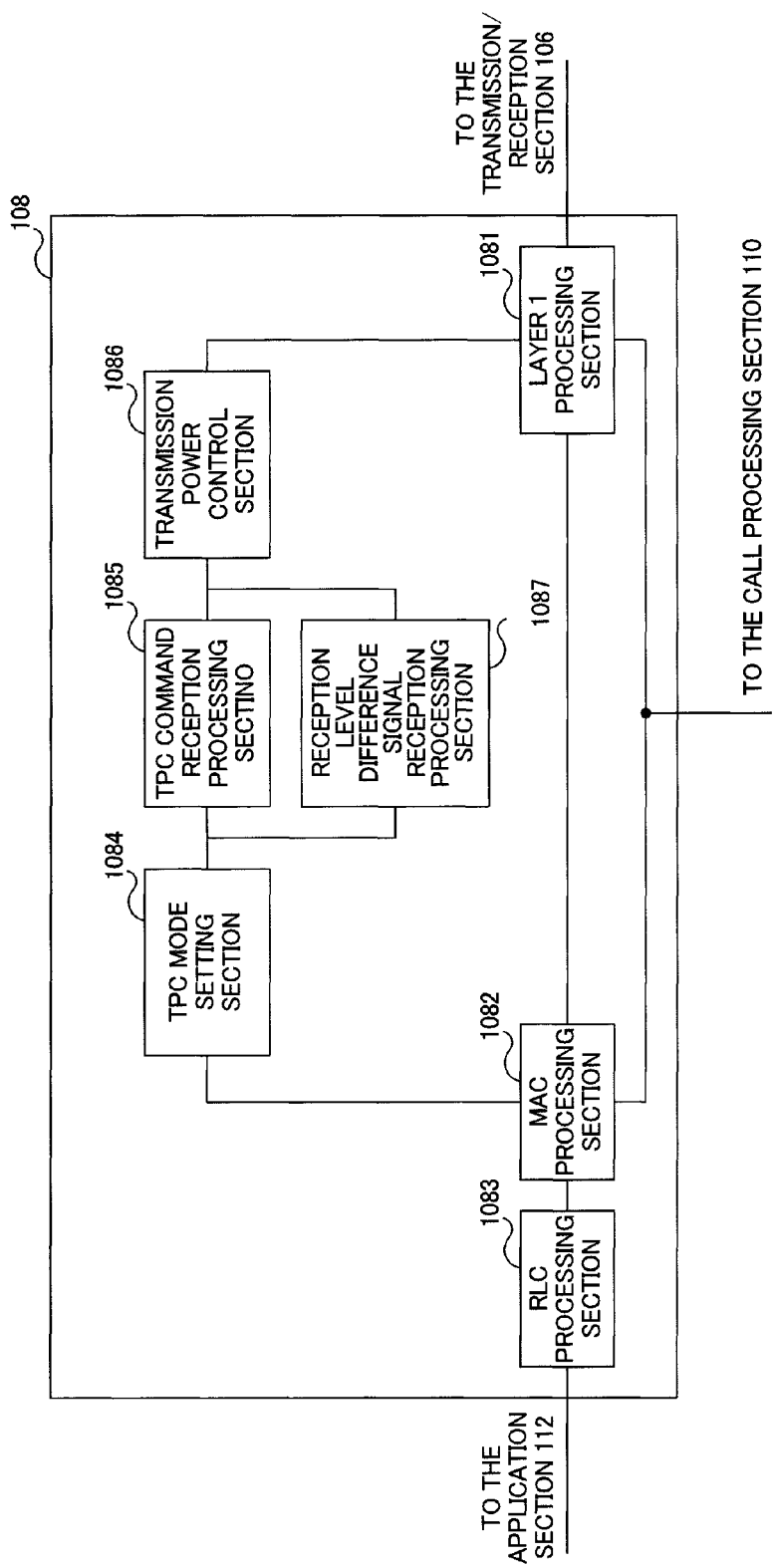
FIG. 17 is a diagram illustrating the another Embodiment of the transmission power control method according to the invention, and is a functional block diagram illustrating a baseband signal processing section of the mobile station apparatus.

Referring to FIG. 17, described is the functional configuration of the baseband signal processing section of the mobile station apparatus. FIG. 17 is a functional block diagram of the baseband signal processing section of the mobile station apparatus.

The baseband signal processing section 108 has the layer 1 processing section 1081, MAC processing section 1082, RLC processing section 1083, TPC command setting section 1084, TPC command reception processing section 1085, transmission power calculating section 1086, and reception level difference signal reception processing section 1087.

The layer 1 processing section 1081 performs the processing mainly on the physical layer. For example, on a signal received in downlink, the layer 1 processing section 1081 performs the processing such as Fourier transform (FFT), frequency demapping, inverse discrete Fourier transform (IDFT), channel decoding and data demodulation. Meanwhile, on a signal to transmit in uplink, the section 1081 performs the processing such as channel coding, data modulation, frequency mapping and inverse Fourier transform (IFFT).

The MAC processing section 1082 performs retransmission control (HARQ) in the MAC layer on a signal received in downlink, analysis (identification of transmission format of the PDSCH, and identification of resource blocks of the PDSCH) of scheduling information for downlink, and the like. Further, the MAC processing section 1082 performs MAC retransmission control on a signal to transmit in uplink, analysis (processing such as identification of transmission format of the PUSCH, and identification of resource blocks of the PUSCH) of uplink scheduling information, and the like.

The RLC processing section 1083 performs segmentation of packets, concatenation of packets, retransmission control in the RLC layer and the like on packets received in uplink and packets received from the application section 112 to transmit in downlink.

According to the TPC mode information received in downlink, the TPC mode setting section 1084 sets the common control mode for applying a common TPC command to the antennas 102a, 102b or the individual control mode for applying individual TPC commands to the antennas 102a, 102b.

The TPC command reception processing section 1085 receives the common TPC command/individual TPC commands to identify the command, according to the TPC mode set by the TPC mode setting section 1084.

The transmission power calculating section 1086 calculates the transmission power in uplink according to the TPC command, reception level difference signal and TPC parameter. In the case of the common control mode, the section 1086 applies the common TPC command to the antennas 102a, 102b and calculates the transmission power. In the case of the individual control mode, the section 1086 applies the individual TPC commands to the antennas 102a, 102b and calculates the transmission power. Further, when the reception level difference signal is received, the section 1086 may add an offset corresponding to the reception level difference to the transmission power of one of the antennas 102a and 102b. In addition, in the case of adding the offset, the common/individual TPC commands received at the time are reset, or the offset is subtracted from the TPC command. In addition, in the case of the individual control mode, the individual TPC command for the antenna without the offset being added by the reception level difference may be applied without any processing. Then, corresponding to the calculation result of the transmission power calculating section 1086, the amplification factors in the amplifying sections 104a, 104b corresponding to the antennas 102a, 102b are adjusted by AGC, respectively, and the transmission power is controlled.

The reception level difference signal reception processing section 1087 receives the reception level difference signal received in downlink to identify the content.

In addition, in this Embodiment, it is configured that the TPC command reception processing section 1085 receives a TPC signal, the transmission power calculating section 1086 calculates the transmission power, and that the amplifying sections 104a, 104b are controlled. Alternately, the application section 112 may receive the TPC signal, calculate the transmission power, and control the amplifying sections 104a, 104b. Further, it is configured that the reception level difference signal reception processing section 1087 receives the reception level difference signal to identify the content. Alternately, the TPC command reception processing section 1085 may receive the reception level difference signal to identify the content, or the application section 112 may receive the reception level difference signal to identify the content.

Figure 18:
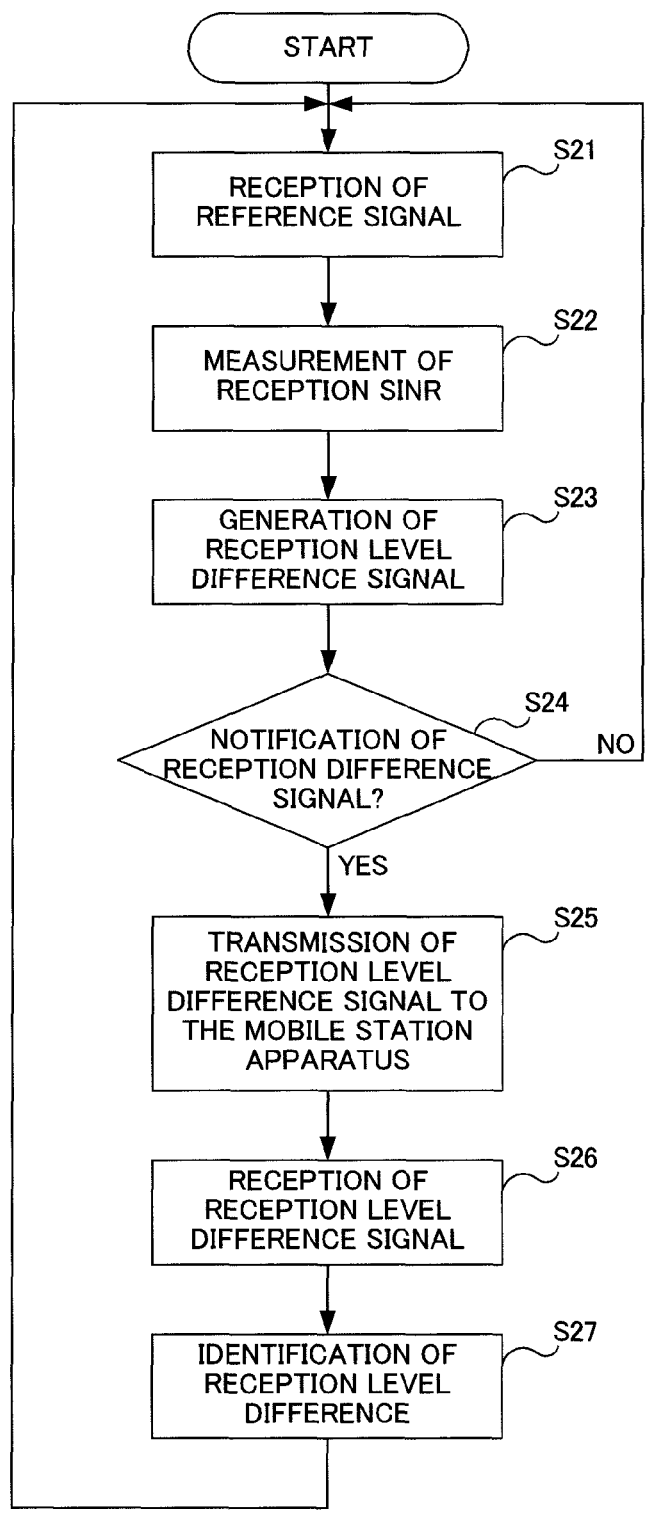
FIG. 18 is a diagram illustrating the another Embodiment of the transmission power control method according to the invention, and is a flowchart of notification processing of a reception level difference signal.

Referring to FIG. 18, described is the communication control processing by the base station apparatus and the mobile station apparatus. In addition, the transmission power control processing is described above, and therefore, the notification processing of the reception level difference signal is only described herein. FIG. 18 is a flowchart of the notification processing of the reception level difference signal. Further, the following flowchart shows an example of the notification processing of the reception level difference signal, and the notification processing is not limited to the content of the processing flow.

First, a reference signal transmitted from the mobile station apparatus 100 is received on the PUSCH (step S21), and the reception SINR measuring section 2084 measures the reception SINR of each of the antennas 102a and 102b of the mobile station apparatus 100 as the reception quality (step S22). The measured reception SINR is input to the inter-antenna reception level difference calculating section 2088, and an inter-antenna reception level difference signal is generated (step S23). The generated reception level difference signal is input to the transmission power control section 2085, and it is determined whether or not to notify the mobile station apparatus 100 of the reception level difference signal (step S24). At this point, for example, when the average reception level difference between the antennas 102*a* and 102*b* is the reference power difference or more, it is determined that the reception level difference signal is notified (step S24; Yes), and the reception level difference signal is transmitted to the mobile station apparatus 100 on the PDSCH or PDCCH (step S25). Meanwhile, when the average reception level difference between the antennas 102*a* and 102*b* is less than the reference power difference, it is determined that the reception level difference signal is not notified (step S24; No), and the processing flow returns to step S21.

When the mobile station apparatus 100 receives the reception level difference signal transmitted from the base station apparatus 200 on the PDSCH or PDCCH (step S26), the reception level difference signal reception processing section 1087 identifies the average reception level difference between the antennas 102*a* and 102*b* included in the reception level difference signal (step S27). Thus, the mobile station apparatus 100 is notified of the average reception level difference between the antennas 102*a* and 102*b*.

As described above, according to the transmission power control method according to this Embodiment, the method has the configuration for enabling either the common control mode for controlling the transmission power using a common TPC command common to two antennas, 102*a*, 102*b*, of the mobile station apparatus 100 or the individual control mode for individually controlling the transmission power of two antennas, 102*a*, 102*b*, of the mobile station apparatus 100 using individual TPC commands, while notifying the mobile station apparatus of a reception level difference among a plurality of antennas of the mobile station apparatus.

Accordingly, as described above, by enabling the control mode in response to the communication environment, it is possible to control the mobile station apparatus 100 having a plurality of antennas to have proper transmission power, while by notifying of the average reception level difference among the plurality of antennas, the mobile station apparatus is capable of setting various kinds of processing to compensate for the average reception level difference among the plurality of antennas.

Further, the Embodiments disclosed this time are illustrative in all the respects, and the invention is not limited to the Embodiments. The scope of the invention is indicated by the scope of the claims rather than by the description of only the above-mentioned Embodiments, and is intended to include senses equal to the scope of the claims and all modifications within the scope of the claims.

INDUSTRIAL APPLICABILITY

As described above, the invention has the effect for enabling the transmission power in the mobile station apparatus having a plurality of antennas to be properly controlled, and particularly, is useful for the transmission power control method, base station apparatus and mobile station apparatus for controlling the uplink transmission power.

The invention claimed is:

1. A transmission power control method for controlling uplink transmission power,
wherein the method enables one of a common control mode for controlling transmission power of a plurality of antennas using a transmission power control signal common to the antennas for a mobile station apparatus having the plurality of antennas, and an individual control mode for controlling transmission power of the plurality of antennas using transmission power control signals for individual antennas for the mobile station apparatus,
wherein, in the common control mode, the transmission power control signal common to the antennas is generated based on a difference between an average value of reception quality of each of the plurality of antennas of the mobile station apparatus, and target reception quality, and
wherein, in the individual control mode, each of the transmission power control signals for individual antennas is generated based on a difference between reception quality of each of the plurality of antennas of the mobile station apparatus, and target reception quality.

2. The transmission power control method according to claim 1, wherein one of the common control mode and the individual control mode is enabled based on moving speed of the mobile station apparatus.

3. The transmission power control method according to claim 1, wherein one of the common control mode and the individual control mode is enabled based on a reception level difference among the plurality of antennas of the mobile station apparatus.

4. The transmission power control method according to claim 3, wherein one of the common control mode and the individual control mode is enabled based on a reception level difference caused by a transmission power setting error among the plurality of antennas of the mobile station apparatus.

5. The transmission power control method according to claim 3, wherein a reception level difference signal is generated based on the reception level difference among the plurality of antennas of the mobile station apparatus, and is transmitted to the mobile station apparatus.

6. The transmission power control method according to claim 5, wherein the reception level difference signal is generated including an antenna number of an antenna as a reference among the plurality of antennas, and a difference of the reception level of a remaining antenna from the reception level of the antenna as a reference.

7. The transmission power control method according to claim 5, wherein the reception level difference among the plurality of antennas of the mobile station apparatus is compared with a predetermined threshold to determine whether or not to transmit the reception level difference signal to the mobile station apparatus.

8. The transmission power control method according to claim 7, wherein the reception level difference among the plurality of antennas of the mobile station apparatus is compared with the predetermined threshold to determine whether to enable the common control mode or the individual control mode, while determining whether or not to transmit the reception level difference signal to the mobile station apparatus.

9. The transmission power control method according to claim 5, wherein when the common control mode is enabled, the reception level difference signal is transmitted to the mobile station apparatus.

10. The transmission power control method according to claim 1, wherein in the individual control mode, the transmission power control signals for the plurality of individual antennas respectively corresponding to the plurality of antennas are sequentially transmitted.

11. The transmission power control method according to claim 1, wherein in the individual control mode, the transmission power control signals for the plurality of individual antennas respectively corresponding to the plurality of antennas are collectively transmitted.

12. The transmission power control method according to claim 1, wherein in the individual control mode, a transmission power control signal for an individual antenna of one of the antennas as a reference, and a relative value are sequentially transmitted, the relative value of a transmission power control signal for an individual antenna of another antenna to the transmission power control signal for an individual antenna of one of the antennas as a reference.

13. The transmission power control method according to claim 1, wherein in the individual control mode, a transmission power control signal for an individual antenna of one of the antennas as a reference, and a relative value are collectively transmitted, the relative value of a transmission power control signal for an individual antenna of another antenna to the transmission power control signal for an individual antenna of one of the antennas as a reference.

14. A base station apparatus for controlling uplink transmission power,
wherein the base station apparatus is configured to be able to switch between a common control mode for controlling transmission power of a plurality of antennas using a transmission power control signal common to the antennas for a mobile station apparatus having the plurality of antennas, and an individual control mode for controlling transmission power of the plurality of antennas using transmission power control signals for individual antennas for the mobile station apparatus,
wherein, in the common control mode, the base station apparatus is configured to generate the transmission power control signal common to the antennas based on a difference between an average value of reception quality of each of the plurality of antennas of the mobile station apparatus, and target reception quality, and
wherein, in the individual control mode, the base station apparatus is configured to generate each of the transmission power control signals for individual antennas based on a difference between reception quality of each of the plurality of antennas of the mobile station apparatus, and target reception quality.

15. The base station apparatus according to claim 14, wherein the base station apparatus is configured to generate a reception level difference signal based on a reception level difference among the plurality of antennas of the mobile station apparatus, and transmit the reception level difference signal to the mobile station apparatus.

16. A mobile station apparatus having a plurality of antennas in which uplink transmission power is controlled by a base station apparatus,
wherein the mobile station apparatus sets a transmission power control signal transmitted from the base station apparatus for one of a common control mode for applying a common transmission power control signal to the plurality of antennas, and an individual control mode for applying individual transmission power control signals to the plurality of antennas,
wherein, in the common control mode, the mobile station apparatus receives the transmission power control signal common to the antennas based on a difference between an average value of reception quality of each of the plurality of antennas of the mobile station apparatus, and target reception quality, and
wherein, in the individual control mode, the mobile station apparatus receives each of the transmission power control signals for individual antennas based on a difference between reception quality of each of the plurality of antennas of the mobile station apparatus, and target reception quality.

* * * * *